(12) United States Patent
Cooley

(10) Patent No.: US 8,720,487 B2
(45) Date of Patent: May 13, 2014

(54) GREASE DELIVERY RECEIVER AND NOZZLE COUPLABLE WITHOUT FLUID PRESSURE BLEED-DOWN AND HAVING PRESSURIZATION LOCKOUT AND FLUSH FACE COUPLING

(76) Inventor: Robert Charles Cooley, Springville, UT (US)

(*) Notice: Subject to any disclaimer, the term of this patent is extended or adjusted under 35 U.S.C. 154(b) by 251 days.

(21) Appl. No.: 13/277,136

(22) Filed: Oct. 19, 2011

(65) Prior Publication Data

US 2012/0090713 A1    Apr. 19, 2012

Related U.S. Application Data

(60) Provisional application No. 61/394,755, filed on Oct. 19, 2010.

(51) Int. Cl.
    *F16L 37/28* (2006.01)
(52) U.S. Cl.
    USPC ................... 137/614.05; 137/614.03
(58) Field of Classification Search
    USPC ............... 137/614.06, 614.03, 614.04, 614, 137/614.05; 251/149.9
    See application file for complete search history.

(56) References Cited

U.S. PATENT DOCUMENTS

| 2,625,410 | A | | 1/1953 | Crowley | |
| 2,675,829 | A | | 4/1954 | Livers | |
| 3,129,919 | A | | 4/1964 | Evans | |
| 3,464,436 | A | * | 9/1969 | Bruning | 137/614.03 |
| 7,306,007 | B2 | * | 12/2007 | Matsumoto | 137/614.06 |
| 8,132,781 | B2 | * | 3/2012 | Haunhorst | 251/149.9 |

* cited by examiner

Primary Examiner — Kevin Lee
(74) Attorney, Agent, or Firm — Angus C. Fox, III

(57) ABSTRACT

A grease and lubricating oil line coupler includes a nozzle and a receiver which can be intercoupled for grease or lubricating oil delivery. Each component is equipped with a normally closed, sealed poppet, which prevents the entrance of dirt and other contaminants into the free ends thereof when decoupled, and which provides an easily-cleanable, flush-faced mating surface. The nozzle has a handle-operated internal valve with an interlock that is controlled by a quick disconnect slidable collar, which prevents the release of lubricants from the nozzle unless it is coupled to the receiver. Only when the nozzle and receiver are interconnected can the valve be opened, and only when the valve is closed can the nozzle be decoupled from the receiver. When the nozzle and receiver are coupled together, internal parts within the two components move to create a path through which lubricants can flow.

16 Claims, 6 Drawing Sheets

GREASE DELIVERY RECEIVER AND NOZZLE COUPLABLE WITHOUT FLUID PRESSURE BLEED-DOWN AND HAVING PRESSURIZATION LOCKOUT AND FLUSH FACE COUPLING

This application has a priority date of Oct. 19, 2011 based on the filing, by the same inventor, of Provisional Patent Application No. 61/394,755, titled GREASE DELIVERY RECEIVER AND NOZZLE COUPLABLE WITHOUT FLUID PRESSURE BLEED-DOWN AND HAVING PRESSURIZATION LOCKOUT AND FLUSH FACE COUPLING.

BACKGROUND OF THE INVENTION

1. Field of the Invention

This invention relates generally to pressurized grease or lubrication delivery systems for heavy construction equipment, earth-moving equipment and other equipment having on-board grease reserves, as well as the ability to safely couple and uncouple the coupler while under line pressure.

2. Description of the Prior Art

Quick-coupling devices are used extensively for transferring fuels and lubricants from supply reservoirs to tanks on self-propelled heavy construction and earth-moving equipment. In addition, there is also a frequent need to couple and decouple pressurized hydraulic lines.

U.S. Pat. No. 2,625,410 to Ernest W. Crowley, titled COUPLING, discloses a quick-disconnect coupling for fluid conduits having movable poppets which close the two separate parts of the conduit to eliminate loss of pressurized or flammable fluids during connection or disconnection.

U.S. Pat. No. 2,675,829 to Carlos B. Livers, titled QUICK-DISCONNECT COUPLING WITH SELECTIVELY OPERABLE VALVE, discloses a coupling having check valves for automatically sealing hydraulic lines when the coupling is disconnected. The check valves can also be opened and closed while the coupling is connected in order to control flow of fluid through the coupling.

U.S. Pat. No. 3,129,919 to Jack M. Evans, titled VALVED QUICK COUPLER, discloses a quick coupler in which one of the separable parts has a valve which is closed when the coupler is uncoupled and opened when the two parts are coupled.

The process of transferring pressurized grease or other less viscous lubricants from a supply reservoir to a storage reservoir on board heavy construction and earth-moving equipment presently requires the depressurization of transfer lines on both the receiver side and supply nozzle side before the nozzle is coupled to the receiver. Depressurization typically involves a bleed-off of pressurized lubricant. Not only is the bleed-off process time consuming, it also results in the discharge of costly petroleum-based lubricant that is a potential environmental pollutant.

Despite the significant useful features disclosed in the prior art relating to quick-disconnect couplers, the prior art does not show a coupler having a flow valve which cannot be actuated while the coupler is in a state of disconnection, which permits connection and disconnection operations while the lines are pressurized without loss of fluid, and which has flush face mating surfaces on both male and female portions of the connector which facilitate cleaning of the mating surfaces so as to avoid contamination of the fluid after coupling occurs.

SUMMARY OF THE INVENTION

The present invention, which overcomes the deficiencies of the prior art, provides a high pressure coupler for pressurized delivery of grease and other lubricating fluids. The coupler includes two interconnectable components: namely a receiver and a nozzle. The receiver and nozzle are each equipped with a normally closed, sealed poppet, which not only prevents the entrance of dirt and other contaminants into that component when they are uncoupled, but also provides an easily-cleanable, flush-faced mating surface on that component. The poppet on the receiver is movable and spring biased, while the poppet of the nozzle, though immovable, if fitted with a spring-biased, slidable annular poppet seat. Furthermore, the nozzle has a handle-controlled internal ball valve with a lockout coupled to a quick disconnect system which prevents rotation of the handle and the concomitant release of lubricants from the nozzle component unless the latter is coupled to the receiver component. As the forward end of the nozzle slides over a free end of the receiver, the receiver poppet is simultaneously pushed back into the receiver body by the nozzle poppet while the slidable annular poppet seat is pushed into the nozzle body, thereby opening a flow path through the receiver and a partial flow path through the nozzle. The nozzle has a circle of ball bearings that align with a circumferential locking groove when the nozzle slides onto the receiver. As a locking collar on the nozzle slides forward from an uncoupled position, it not only locks the ball bearings within the locking groove—which locks the nozzle to the receiver, but also unlocks the handle. When the handle is unlocked, the handle can be rotated about 90 degrees. The handle is rigidly affixed to a shaft which is coupled to a rotatable internal ball valve. As the handle and shaft are rotated, the ball valve opens, thereby completing the flow path through the nozzle so that grease or other lubricating fluid can flow through the nozzle, into the receiver, and then into a storage tank.

PREFERRED EMBODIMENT OF THE INVENTION

The new grease coupler for pressurized delivery of grease and other lubricating fluids will now be described in detail, with reference to the attached drawing figures. Item numbers 100 and 100 plus a two-digit integer refer to the receiver and its components. Item numbers 200 and 200 plus a two-digit integer refer to the nozzle and its components.

Figure 1:
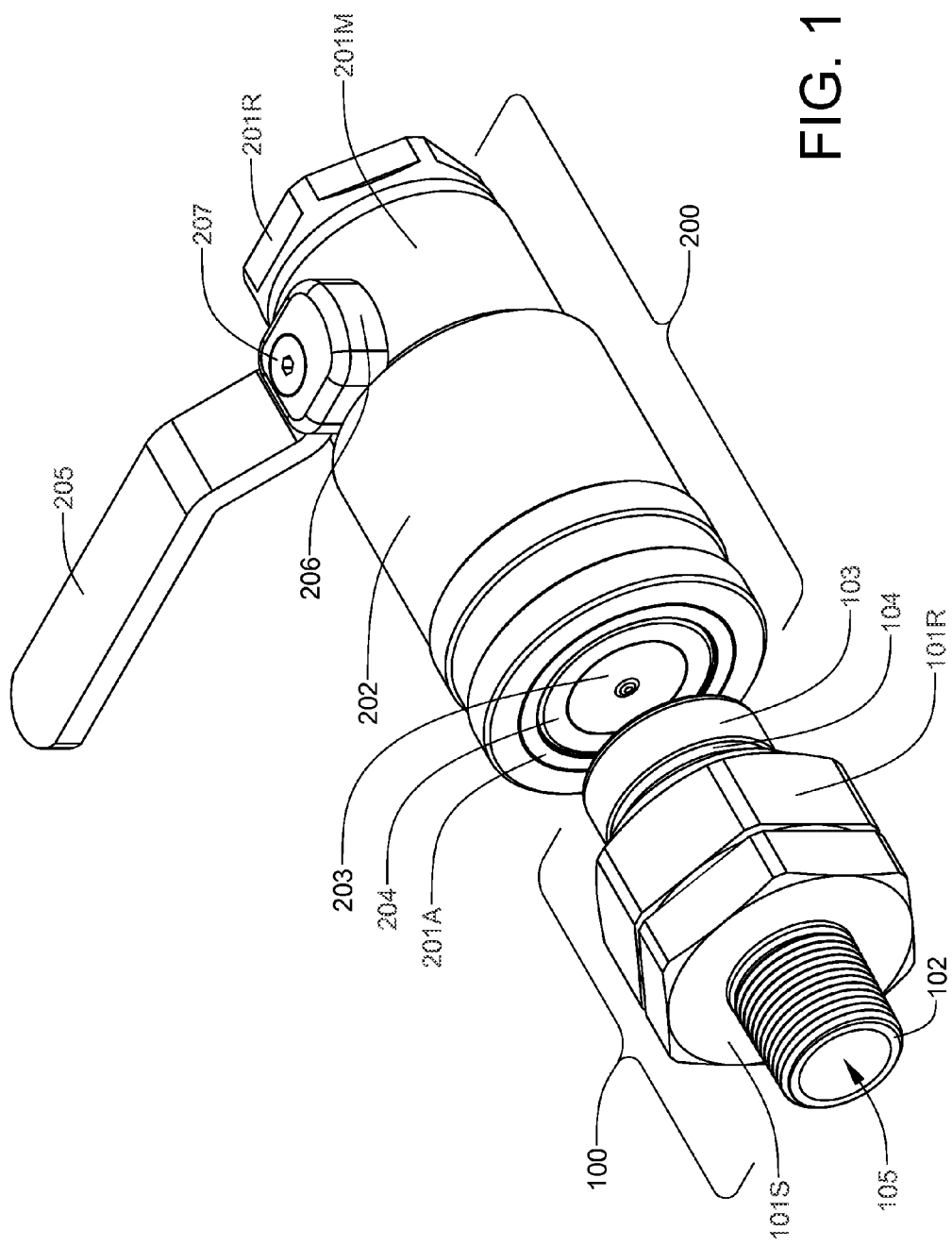
FIG. 1 is an isometric view of the uncoupled receiver and nozzle components of the new grease coupler.

Referring now to FIG. 1, the coupler includes two interconnectable components: namely a receiver 100 and a nozzle 200. The receiver 100 has a two part body which includes a receiving portion 101R and a securing portion 101S. The securing portion 101S is equipped with a male pipe fitting 102 that can screwed into the female pipe fitting at the end of a high-pressure flexible hose, high-pressure metal line, or storage tank. The receiving portion 101R, on the other hand, has a cylindrical receiving extension 103, that is equipped with an annular circumferential locking groove 104, which enables the nozzle 200 to lock on to the cylindrical receiving extension 103. The securing portion 101S is threadably secured to the receiving portion 101R. Together, they form a flow-through internal chamber, the exit 105 from the internal chamber passes through the male pipe fitting 102.

Still referring to FIG. 1, the nozzle 200 is equipped with an anterior body portion 201A, a middle body portion 201M, and a rear body portion 201R. The rear body portion 201R, which is couplable to a grease supply line, is at the entrance end of the nozzle 200. A two-piece locking collar 202 slides over the exterior of the anterior body portion 201A, while a generally cylindrical nozzle poppet head 203 is coupled to a nozzle poppet shaft (not shown in this view) that is rigidly secured within the anterior body portion. A spring-biased, slidable annular poppet seat 204 completely surrounds the nozzle poppet head 203. A handle 205 and interlock/rotation limiter 206 are rigidly secured to a rotatable valve actuator shaft (not visible in this view) with a handle securing screw 207. The rotatable valve actuator shaft is, in turn, coupled to a rotatable ball valve (also not visible in this view) within the middle body portion 201M. Rotation of the handle 205 and the internal ball valve allows grease to flow from the entrance end of the nozzle 200 to the exit end thereof. The interlock/rotation limiter 206, which is an eccentric device, prevents the handle 205 and the coupled ball valve from being rotated when the nozzle 200 is not coupled to the receiver 100 and insufficient clearance exists between the rear edge of the locking collar 202 and the interlock/rotation limiter 206. It will be noted that the nozzle poppet 203, in combination with the annular poppet seat 204 and the anterior body portion 201A, form a generally flush face mating surface, which is easily cleanable.

Figure 2:
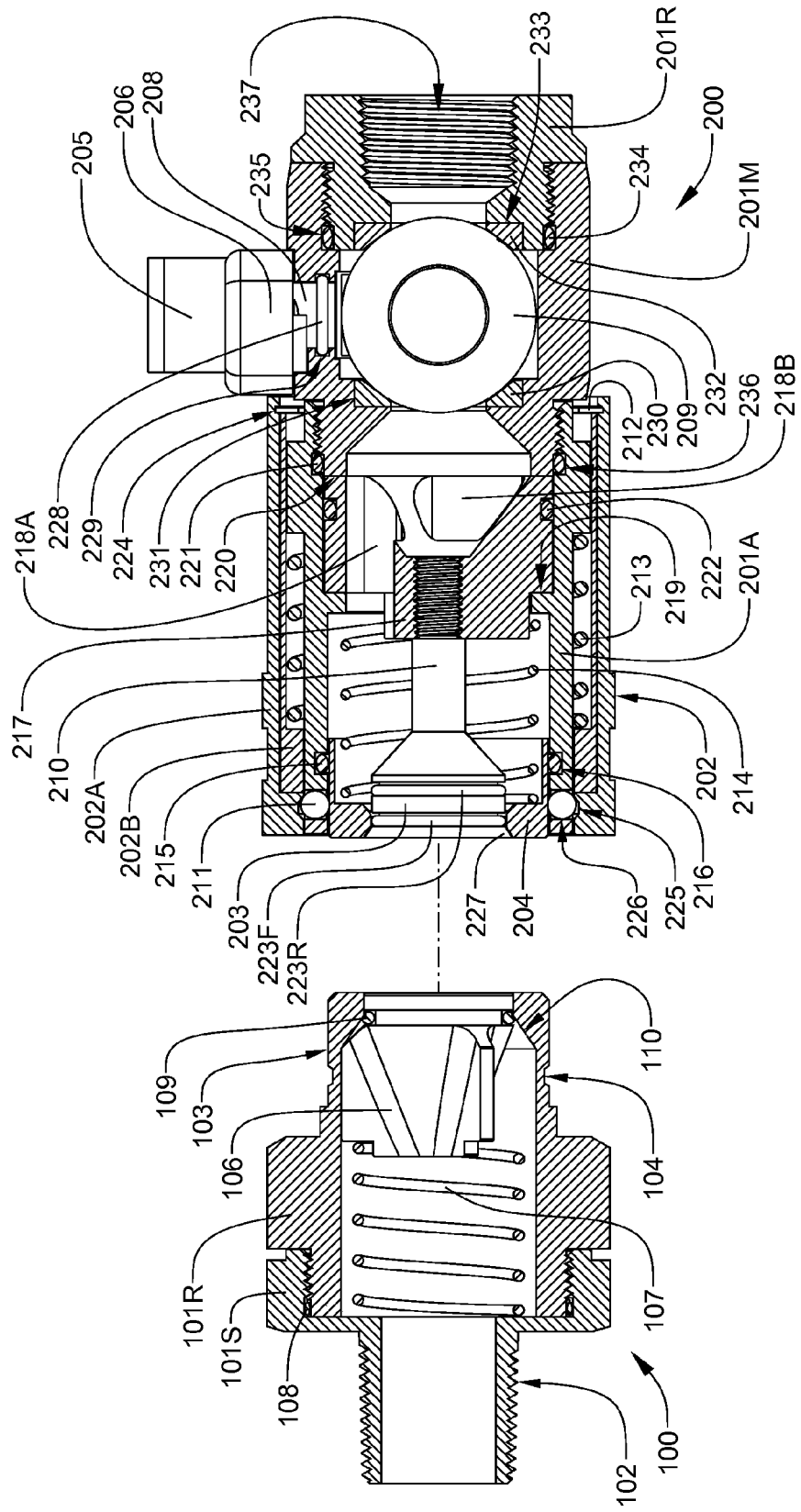
FIG. 2 is a partial cut-away, partial cross-sectional view, taken through the central axes of the uncoupled receiver and nozzle.

Referring now to FIG. 2, the receiver 100 and nozzle 200 are shown uncoupled in a partial cut-away, partial-cross section. The receiver poppet 106 is shown in elevational format, while the internal receiver poppet biasing spring 107, a receiver body O-ring 108, a receiver poppet O-ring 109, and the receiving portion 101R and securing portion 101S of the receiver body are shown in cross-sectional format. The receiver poppet 106 and the internal biasing spring 107 are installed within the receiver 100 before the receiving portion 101R is threadably secured to the securing portion 101S. It will be noted that the receiver body O-ring 108 seals the joint between the receiving portion 101R and the securing portion 101S. The internal biasing spring 107 applies pressure against the receiver poppet 106 so that the receiver poppet O-ring 109 deforms and seals the entrance of the receiver 100 when it is not coupled to the nozzle 200. It will be noted that the receiver poppet 106 is biased by the spring 107 against a conical surface 110 near the entrance of the receiving portion 101R.

Now focusing on the nozzle 200 of FIG. 2, only the handle 205, the interlock/rotation limiter 206, the valve actuator shaft 208, the valve ball 209, the nozzle poppet head 203, the nozzle poppet shaft 210, and a plurality of steel latching balls 211 are shown in elevational format. All other nozzle components are shown in cross-sectional format. The locking collar 202 includes an anodized aluminum outer portion 202A and a zinc-plated steel inner portion 202B, which is better able to withstand pressure exerted on the steel latching balls 211, without deformation, when the nozzle 200 is coupled to the receiver 100 and the system is pressurized with grease at around 2000 pounds per square inch. The outer and inner portions 202A and 202B of the locking collar 202 are held together with a circumferential internal snap ring 212, which also limits the forward travel of the locking collar 202. The locking collar 202 is forward biased by a collar biasing coil spring 213, while the slidable annular poppet seat 204 is forward biased by a seat biasing coil spring 214. An anterior body O-ring 215, that fits within an internal O-ring groove 216 of the anterior body portion 201A, not only seals the joint between the slidable annular poppet seat 204 and the anterior body portion 201A when the nozzle 200 is decoupled from the receiver 100, but also seals the joint between the receiving extension 103 and the anterior body portion 201A when the nozzle 200 and the receiver 100 are coupled together. The nozzle poppet shaft 210 is threadably secured to a spindle 217, which incorporates three flow through passages that are equally radially spaced about the spindle's central axis, only two of which 218A and 218B are visible in this view (the third passage has been cut off in the cross section). The spindle 217 is secured between an inward-facing interior flange 219 of the anterior body portion 201A and a front face 220 of the middle body portion 201M. The middle body portion 201M is threadably secured to the anterior body portion 201A. The joint between the anterior body portion 210A and the middle body portion 210M is sealed with a middle-body front O-ring 221.

Still referring to FIG. 2, the anterior portion of the nozzle is preferably assembled in the following sequence. A spindle O-ring 222 is installed on the spindle 217, after which the spindle 217 is inserted into the rear of the anterior body portion 201A. The purpose of the spindle O-ring 222 is not to is to seal any joint, but rather to hold the spindle 217 firmly in place within the anterior body portion 201A during assembly. A front poppet head O-ring 223F and a rear poppet head O-ring 223R are installed within the O-ring grooves in the poppet head 203. The anterior body O-ring 215 is then installed within the internal O-ring groove 216 of the anterior body portion 201A. Next, the slidable annular poppet seat 204 and the seat biasing coil spring 214 are installed in the front of the anterior body portion 201A. Next, the nozzle poppet shaft 210 is threadably secured to the spindle 217, preferably with thread locking compound. As the external threads at the end of the nozzle poppet shaft 210 engage the internally threaded aperture 301 (please refer to FIG. 3) of the spindle 217, the slidable annular poppet seat 204 is urged rearward, thereby compressing the seat biasing coil spring 214. Next, the collar biasing coil spring 213 is installed over the front end of the anterior body portion 201A. Then, the two-piece locking collar 202 is slid over the forward end of the anterior body portion 201A, compressing the collar biasing coil spring 213. With the collar biasing coil spring 213 in a state of compression, the circumferential internal snap ring 212 is installed in the internal groove 224 of the outer portion 202A of the two-piece locking collar 202. Next, the two-piece locking collar is moved rearward so that the inner annular latching groove 225 in the outer portion 202A of the two-piece locking collar 202 is aligned with the latching ball apertures 226 in the anterior body portion 201A. Then the slidable annular poppet seat 204 is moved rearward to expose the latching ball apertures 226, and the steel latching balls 211 are installed therein. The slidable annular poppet seat 204 is then permitted to slide forward, thereby trapping the steel latching balls 211. Forward movement of the slidable annular poppet seat 204 is limited by the conical flare 227 at the forward end of the nozzle poppet 203.

Still referring to FIG. 2, the valve ball 209, the valve actuator shaft 209, the handle 205, and the interlock/rotation limiter 206 are installed within the middle body portion 201M in the following sequence. An actuator shaft O-ring 228 is then installed within an O-ring groove 229 in an actuator shaft aperture. The valve actuator shaft 208 is then installed within the actuator shaft aperture from inside the middle body portion 201M, and the interlock/rotation limiter 206 and handle 205 are secured to the valve actuator shaft 208 with the handle securing screw 207. Next, a front annular sealing ring 230 is installed within the sealing ring recess 231 of the middle body portion 201M. Then, with the handle 205 turned to the OFF position, the valve ball 209 is rocked into position, with a slot 901 (see FIG. 9) in the valve ball 209 engaging a blade 801 (see FIGS. 8 and 9) at the lower end of the actuator shaft 208. A rear annular sealing ring 232 is then inserted in the sealing ring recess 233 of the rear body portion 201R, a rear-body O-ring 234 is installed in the annular recess 235 within the middle body portion 201M, and the rear body portion is screwed into the rear of the middle body portion 201M. Thus, the rear body portion 201R functions as a ball valve component retainer. The middle-body O-ring 221 is then installed in the annular recess 236 within the anterior body portion 201A, and the middle body portion 201M is screwed into the rear of the anterior body portion 201A, thereby trapping the spindle 217. The female pipe thread 237 at the grease entrance within rear body portion 201R is threadably couplable to a grease line (not shown).

Figure 4:
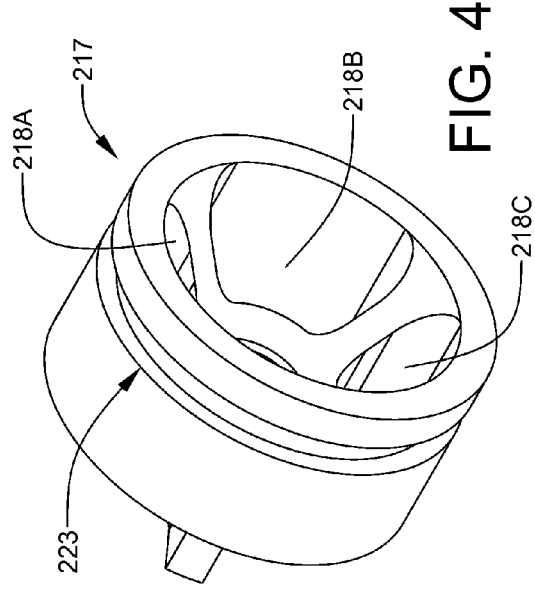
FIG. 4 is an enlarged isometric view of the spindle, showing primarily the rear thereof.
Figure 3:
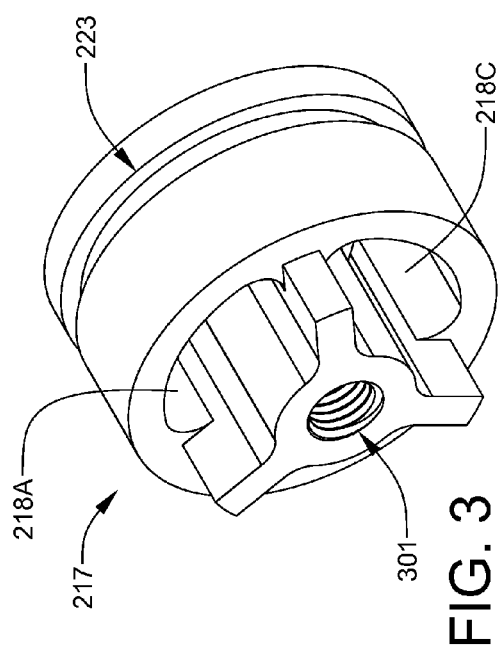
FIG. 3 is an enlarged isometric view of the spindle, showing primarily the front thereof.

Referring now to FIGS. 3 and 4, these isometric views of spindle 217 enable a more thorough visualization of the component. The spindle has a threaded central aperture 301, which the threaded end of the nozzle poppet shaft 210 engages. The spindle O-ring groove 223 is also visible on both of these views, as are all three flow-through passages 218A, 218B and 218C.

Figure 6:
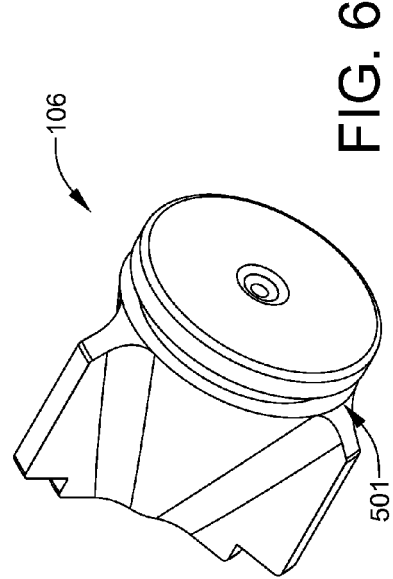
FIG. 6 is an enlarged isometric view of the receiver poppet, showing primarily the front thereof.
Figure 5:
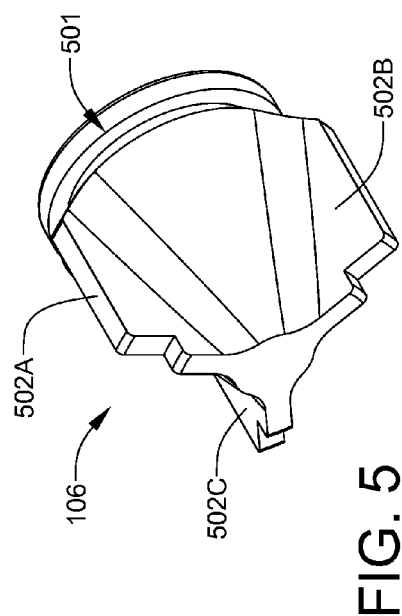
FIG. 5 is an enlarged isometric view of the receiver poppet, showing primarily the rear thereof.

Referring now to FIGS. 5 and 6, these isometric view of the receiver poppet 106 enable a more thorough visualization of the component. The receiver poppet O-ring groove 501, into which the receiver poppet O-ring 109 is installed, is also visible in these views. In addition, the receiver poppet 106 has three fins 502A, 502B and 502C, which maintain the receiver poppet 106 in axial alignment within the receiver component of the receiver 100.

Figure 7:
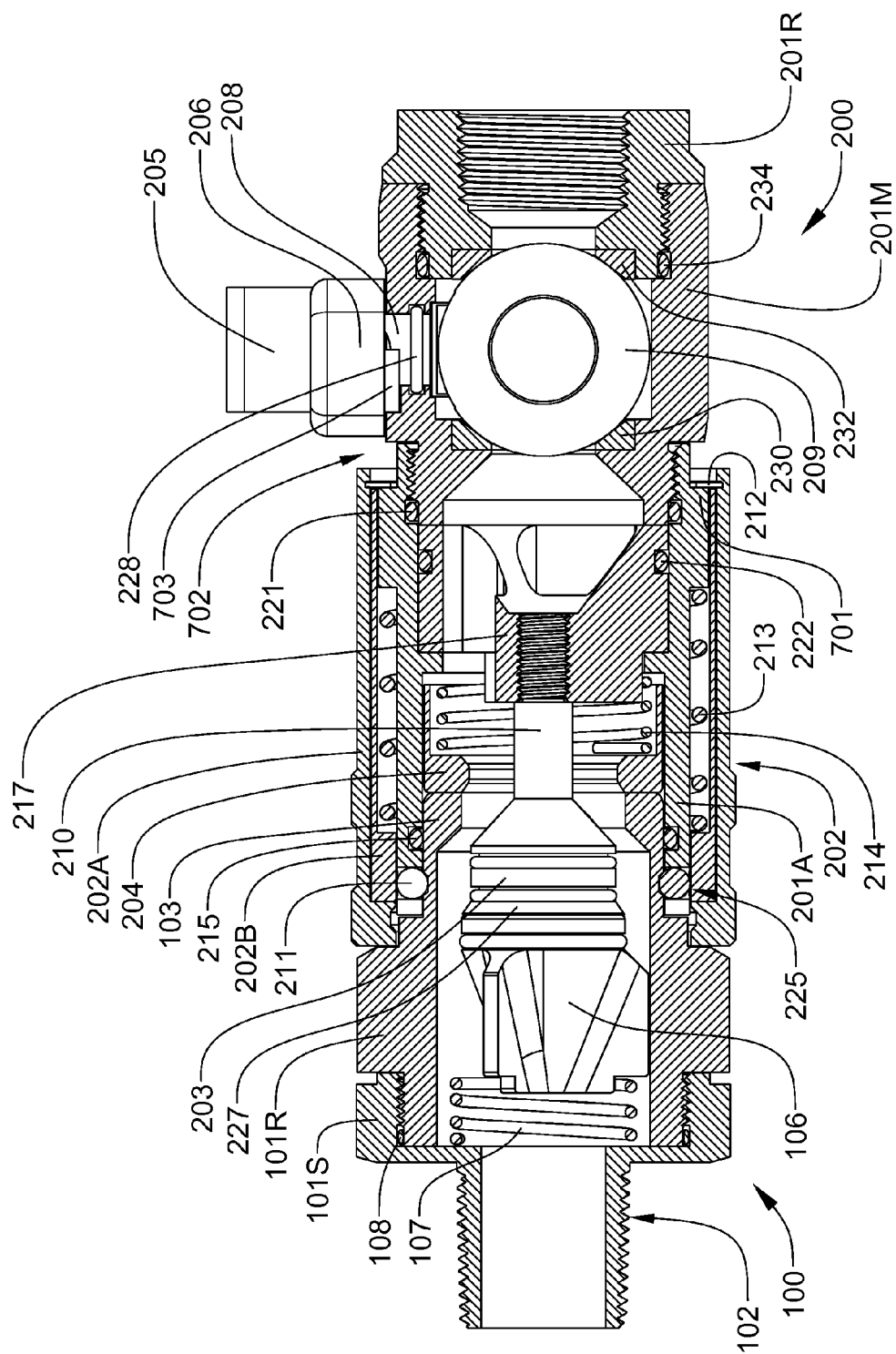
FIG. 7 is a partial cut-away, partial cross-sectional view, taken through the central axes of the intercoupled receiver and the nozzle, with the actuator handle in the "OFF" position.

Referring now to FIG. 7, the anterior body portion 201A of the nozzle 200 has been slid over the cylindrical receiving extension 103 of the receiver 100. As the anterior portion 101A slides over the cylindrical receiving extension 103, theslidable annular poppet seat 204 is urged rearward, thereby compressing the nozzle poppet biasing spring 214 and opening up a flow path through the nozzle. At the same time, the receiver poppet 106 is urged rearward into the receiving portion 101R of the receiver 100, thereby compressing the receiver poppet biasing spring 107, and opening up a flow path through the receiver 100. Once the steel latching balls 211 have engaged the annular circumferential locking groove 104, the locking collar 202 can be slid forward, thereby locking the steel latching balls 211 within the locking groove 104 and locking the nozzle 200 to the receiver 100. Forward movement of the locking collar 202 is limited by contact of the snap ring 212 with an annular flange 701 of the anterior body portion 201A. After the locking collar 202 has been slid forward, sufficient clearance 702 is provided for the interlock/rotation limiter 206 to be rotated with the handle 205. The handle 205 is rigidly coupled to the valve actuator shaft 208, which is now able to axially rotate the valve ball 209 about 90 degrees. A rotation limiter tab 703 on the interlock/rotation limiter 206 rides within an arcuate cutout (not shown in this view) in the middle body portion 201M, thereby limiting rotation of the interlock/rotation limiter 206 and coupled valve actuator shaft 208 and valve ball 209.

Figure 8:
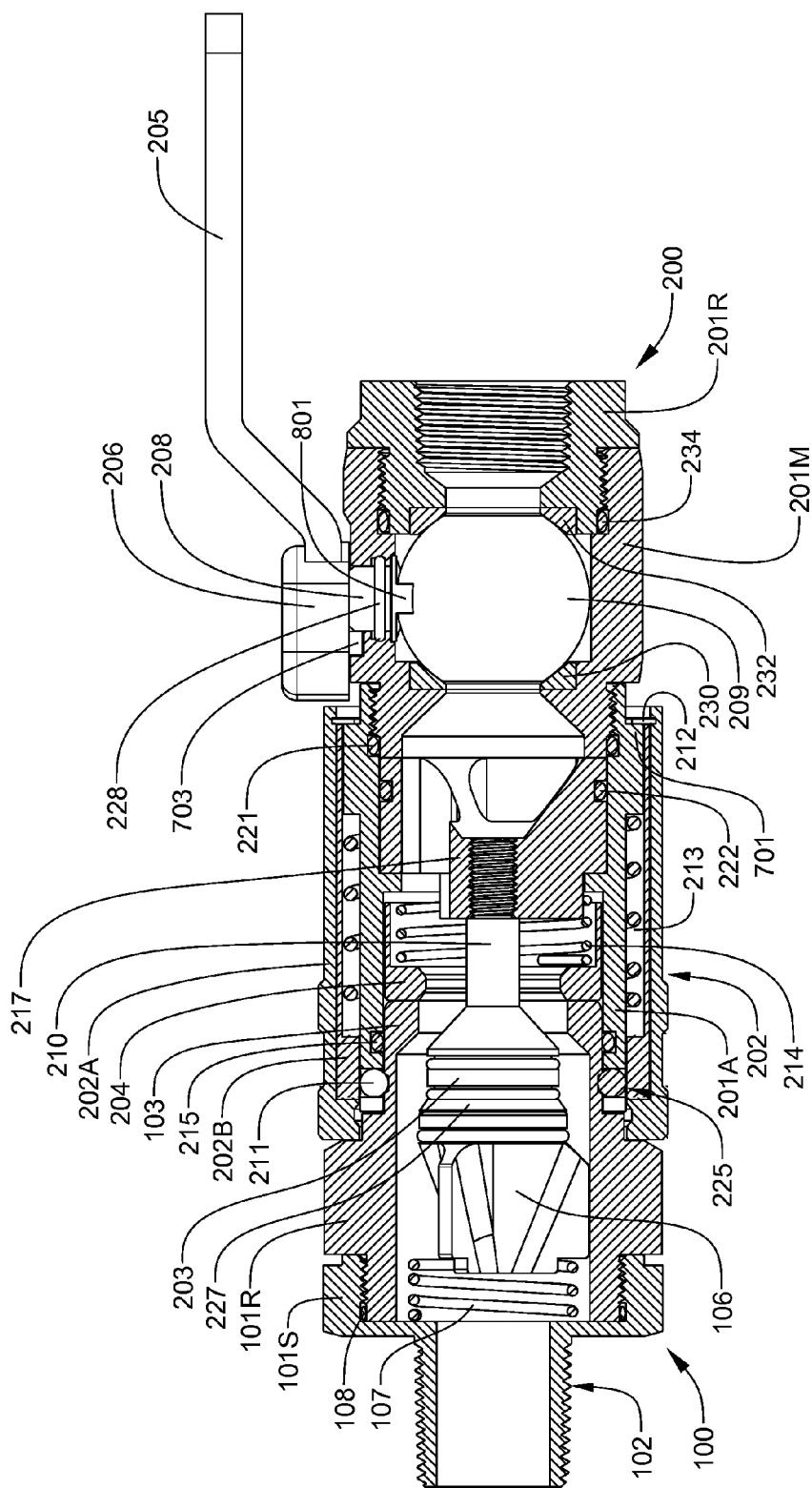
FIG. 8 is a partial cut-away, partial cross-sectional view, taken through the central axes of the intercoupled receiver and the nozzle, with the actuator handle in the "ON" position.
Figure 9:
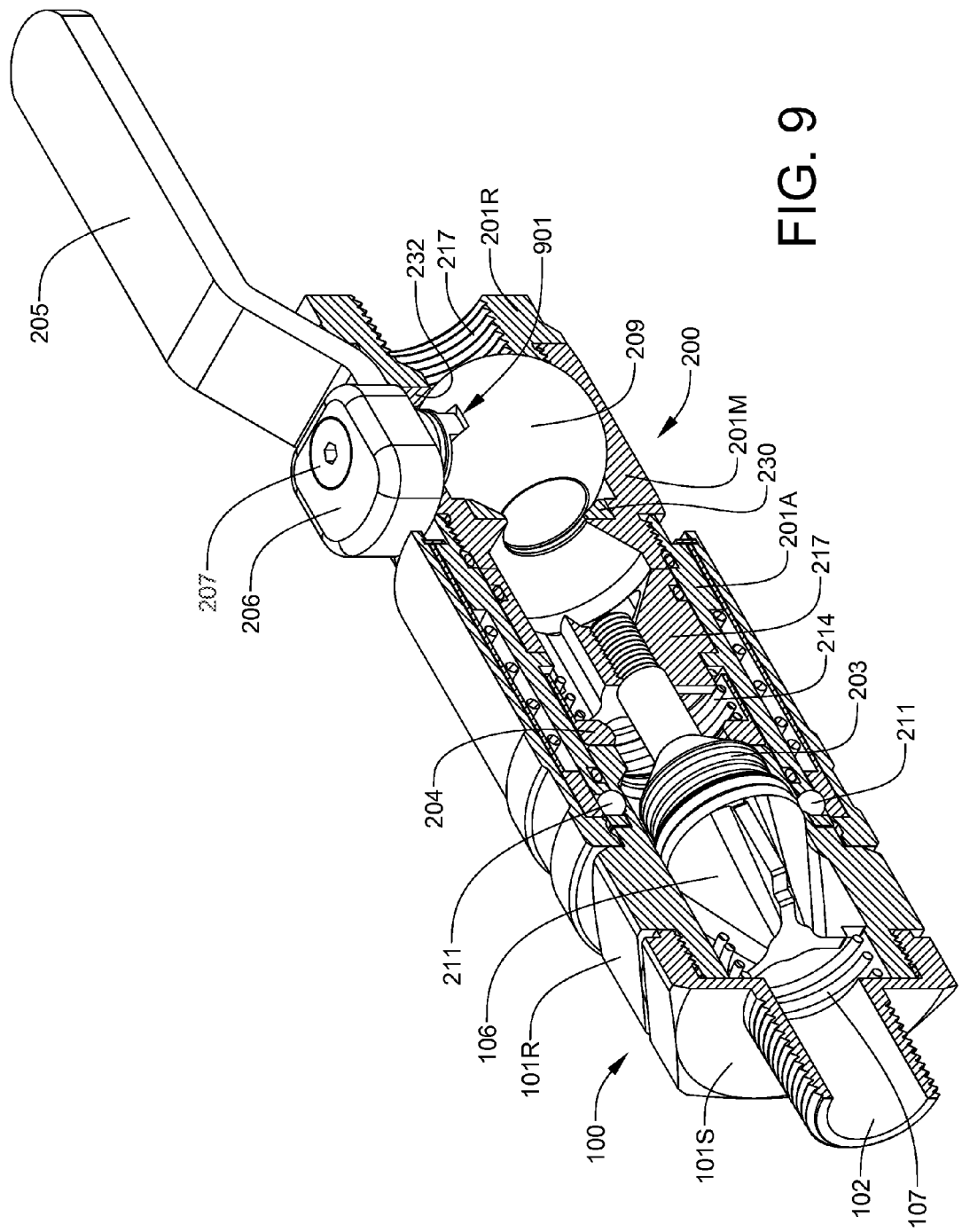
FIG. 9 is an isometric, partial cut-away, partial cross-sectional view of the coupled receiver and nozzle of the new grease coupler, with the actuator handle in the "ON" position.

Referring now to FIGS. 8 and 9, when the handle 205 is turned to the "ON" position, the valve ball 209 rotates, thereby allowing grease or other lubricating fluid to flow through the nozzle 200 and into the receiver 100. When a desired quantity of grease has been transferred through the nozzle 200 and into the receiver 100, the handle 205 can be turned to shut off the flow of grease. Once the handle 205 has been rotated to the OFF position, the nozzle 200 can be decoupled from the receiver 100.

Although only a single embodiment of the invention is shown and described herein, it will be obvious to those having ordinary skill in the art that changes and modifications may be made thereto without departing from the scope and the spirit of the invention as hereinafter claimed.

What is claimed is:

1. A grease line coupler comprising:
    a receiver having a body with a cylindrical receiving extension, said receiving extension having an entrance opening, said receiving extension housing a slidable poppet that is spring biased toward said entrance opening so that said entrance opening is normally closed; and
    a nozzle having a generally hollow body with an exit opening, said body enclosing an immovable poppet that extends to the exit opening, said nozzle body also enclosing and surrounding a slidable, annular poppet seat that is spring-biased toward the exit opening so that it surrounds the immovable poppet, seals the exit opening, and forms, with the nozzle body and with the immovable poppet, an easily cleanable generally planar face when the nozzle is decoupled from said receiver, said body housing an internal ball valve that controls the flow of pressurized lubricating fluid through the nozzle, said ball valve coupled to a rotatable shaft to which an external handle is secured, said valve actuatable with said handle only when the nozzle exit opening is coupled to the receiver entrance opening;
    wherein the slidable receiver poppet and the receiver body form an easily-cleanable, generally flush face when the receiver is decoupled from the nozzle and the slidable poppet is biased to a forwardmost position so as to seal the entrance opening.

2. The grease line coupler of claim 1, wherein the body of said nozzle comprises:
    an anterior body portion within which the immovable poppet is secured, and in which the annular poppet seat slides;
    a middle body portion which houses the ball valve and which is threadably secured to said anterior body portion; and
    a rear body portion threadably secured to said middle body portion, said rear body portion couplable to a grease line and functioning as a ball valve component retainer.

3. The grease line coupler of claim 2, wherein during an intercoupling of said nozzle with said receiver, said anterior body portion slides over the cylindrical receiving extension of said receiver body, with the fixed poppet of the nozzle depressing the receiver poppet so as to open a flow-through path within the receiver, and with said cylindrical receiving extension displacing said annular poppet seat so as to open a flow-through path through the anterior body portion.

4. The grease line coupler of claim 3, wherein the cylindrical receiving extension of said receiver incorporates an annular circumferential locking groove and the anterior body portion of said nozzle is equipped with a plurality of radially-spaced latching balls that are installed within latching ball apertures within the anterior body portion, said latching balls engaging the annular circumferential locking groove when said anterior body portion slides over the cylindrical receiving extension, said anterior body portion having a forward-biased slidable locking collar that slides forward to lock the latching balls into the annular circumferential locking groove once the latching balls have engaged the annular circumferential locking groove.

5. The grease line coupler of claim 4, wherein the nozzle further comprises a spindle that is secured in place within the anterior body portion by the middle body portion, said spindle having a central aperture within which the immovable poppet of the nozzle is secured.

6. The grease line coupler of claim 5, wherein said nozzle poppet comprises:
   a generally cylindrical poppet head having a tapered outer flange which limits forward travel of the annular poppet seat; and
   a poppet shaft rigidly affixed to the poppet head, said poppet shaft having a externally threaded end spaced from the poppet head that threadably engages the spindle's central aperture, which is internally threaded.

7. The grease line coupler of claim 4, which further comprises an eccentric interlock/rotation limiter that is secured to the rotatable shaft which operates the ball valve, said eccentric interlock/rotation limiter preventing the handle from being rotated when the nozzle is decoupled from the receiver and there exists insufficient clearance between a rear edge of the slidable locking collar and the interlock/rotation limiter.

8. The grease line coupler of claim 6, wherein:
   the slidable receiver poppet is equipped with an external O-ring, which contacts the receiver body, thereby sealing the entrance opening when the receiver is decoupled from the nozzle; and
   the immovable poppet is equipped with at least an external forward O-ring and said anterior body portion is equipped with an internal O-ring, said forward O-ring acting to seal a joint between the annular poppet seat and the poppet head, and said internal O-ring acting to seal a joint between the annular poppet seat and the anterior body portion when the nozzle is decoupled from the receiver and the annular poppet seat has been urged to its forwardmost position.

9. A grease line coupler comprising:
   a receiver having a body with an entrance opening that is sealed by a spring-biased slidable poppet; and
   a nozzle having a body with an exit opening in an anterior portion thereof, which is sealed by a spring-biased slidable annular poppet seat, that rides over an immovable central poppet, said nozzle also having a slidable locking collar that alternatively either latches in a rearward position when the nozzle is decoupled from the receiver or latches the nozzle to the receiver when the nozzle is coupled to the receiver, said body housing an internal ball valve that controls the flow of pressurized lubricating fluid through the nozzle, said ball valve coupled to a rotatable shaft to which an eccentric lockout and a handle are secured, said eccentric lockout preventing actuation of said ball valve when the nozzle is decoupled from the receiver and the locking collar is latched in the rearward position;
   wherein the slidable receiver poppet and the receiver body form an easily-cleanable, generally flush face when the receiver is decoupled from the nozzle and the slidable poppet is biased to a forwardmost position so as to seal the entrance opening; and the immovable poppet, the annular poppet seat, and the anterior portion of the nozzle body form an easily-cleanable, generally flush face when the nozzle is decoupled from the receiver and the annular poppet seat is biased to a forward most position so as to seal the exit opening.

10. The grease line coupler of claim 9, wherein said receiver body incorporates a cylindrical receiving extension, which houses the slidable poppet that is spring biased toward said entrance opening, and the body of said nozzle comprises an anterior body portion in which said immovable central poppet and said slidable annular poppet seat are installed, said anterior body portion sliding over the cylindrical receiving extension when the nozzle is coupled to the receiver, with the fixed poppet of the nozzle thereby depressing the receiver poppet so as to open a flow-through path within the receiver, and with said cylindrical receiving extension displacing said annular poppet seat so as to open a flow-through path through the anterior body portion.

11. The grease line coupler of claim 10, wherein the body of said nozzle further comprises:
   a middle body portion which houses the ball valve and which is threadably secured to said anterior body portion; and
   a rear body portion threadably secured to said middle body portion, said rear body portion couplable to a grease line and functioning as a ball valve component retainer.

12. The grease line coupler of claim 11, wherein the cylindrical receiving extension of said receiver incorporates an annular circumferential locking groove and the anterior body portion of said nozzle is equipped with a plurality of radially-spaced latching balls that are installed within latching ball apertures within the anterior body portion, said latching balls engaging the annular circumferential locking groove when said anterior body portion slides over the cylindrical receiving extension, said anterior body portion having a forward-biased slidable locking collar that slides forward to lock the latching balls into the annular circumferential locking groove once the latching balls have engaged the annular circumferential locking groove.

13. The grease line coupler of claim 12, wherein the nozzle further comprises a spindle that is secured in place within the anterior body portion by the middle body portion, said spindle having a central aperture within which the immovable poppet of the nozzle is secured.

14. The grease line coupler of claim 13, wherein said nozzle poppet comprises:
   a generally cylindrical poppet head having a tapered outer flange which limits forward travel of the annular poppet seat; and
   a poppet shaft rigidly affixed to the poppet head, said poppet shaft having a externally threaded end spaced from the poppet head that threadably engages the spindle's central aperture, which is internally threaded.

15. The grease line coupler of claim 12, which further comprises an eccentric interlock/rotation limiter that is secured to the rotatable shaft which operates the ball valve, said eccentric interlock/rotation limiter preventing the handle from being rotated when the nozzle is decoupled from the receiver and there exists insufficient clearance between a rear edge of the slidable locking collar and the interlock/rotation limiter.

16. The grease line coupler of claim 14, wherein:
the slidable receiver poppet is equipped with an external O-ring, which contacts the receiver body, thereby sealing the entrance opening when the receiver is decoupled from the nozzle; and
the immovable poppet is equipped with at least an external forward O-ring and said anterior body portion is equipped with an internal O-ring, said forward O-ring acting to seal a joint between the annular poppet seat and the poppet head, and said internal O-ring acting to seal a joint between the annular poppet seat and the anterior body portion when the nozzle is decoupled from the receiver and the annular poppet seat has been urged to its forwardmost position.

* * * * *